United States Patent [19]

Drauglis

[11] 4,134,638

[45] Jan. 16, 1979

[54] LOW OBSCURATION SPIDER FOR SUPPORTING OPTICAL ELEMENT

[75] Inventor: Clyde O. Drauglis, Willow Grove, Pa.

[73] Assignee: Edmund Scientific Company, Barrington, N.J.

[21] Appl. No.: 830,090

[22] Filed: Sep. 2, 1977

[51] Int. Cl.² ............................ G02B 17/06; G02B 23/06
[52] U.S. Cl. ............................................. 350/49; 350/27
[58] Field of Search ........................ 350/48, 49, 55, 27, 350/28, 29, 310, 252, 319, 321

[56] References Cited

U.S. PATENT DOCUMENTS

| | | | |
|---|---|---|---|
| 2,513,723 | 7/1950 | Greenwood et al. | 350/252 |
| 2,948,189 | 8/1960 | Fischer | 350/55 |
| 3,064,526 | 11/1962 | Lindsay | 350/55 |

OTHER PUBLICATIONS

*Sky and Telescope*, Oct. 1969, Sky Publishing Corp., Cambridge, Mass. pp. 262–263.
Ingalls, Albert G., Ed., *Amateur Telescope Making–Advanced Book Two*, Scientific Amer., Inc., 1972, pp. 620–622.
Sidgwick; J. B., *Amateur Astronomers Handbook*, Faber & Faber, London, 1955, pp. 41–42.
Advertisement, *Sky and Telescope*, Nov. 1977, for "Research Quality Spiders and Secondary Holders", Kenneth F. Novak & Co.

*Primary Examiner*—Jon W. Henry
*Attorney, Agent, or Firm*—George A. Smith, Jr.

[57] ABSTRACT

In a reflecting telescope, a diagonal mirror is supported by a spider comprising four thin flexible metal vanes secured to a mirror carrier by axially slotted pins which are rotatable for adjusting vane tension. These vanes provide an extremely stable mirror support, which exhibits low obscuration and minimizes the effect of diffraction spikes.

21 Claims, 5 Drawing Figures

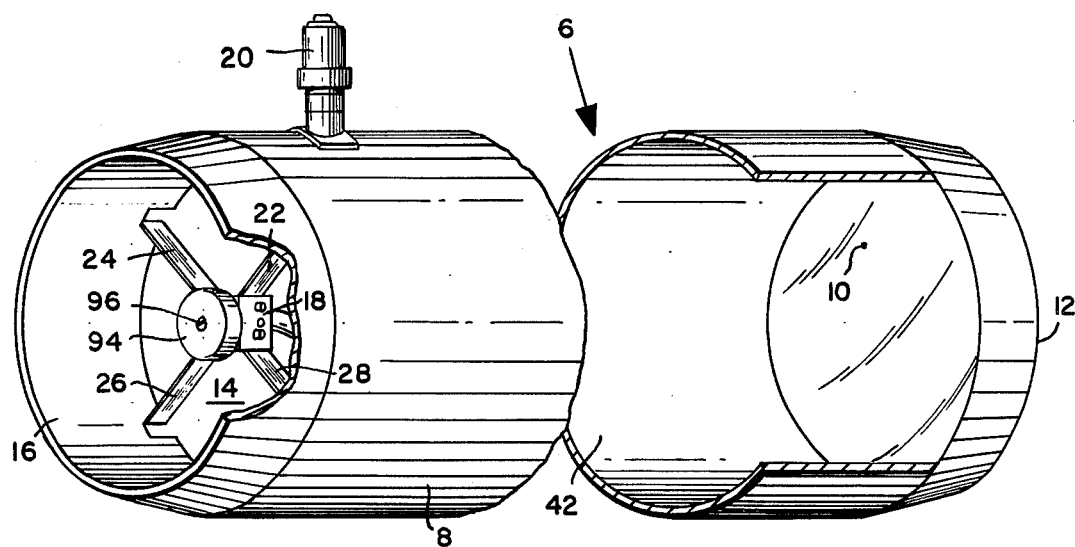
FIG. 1.
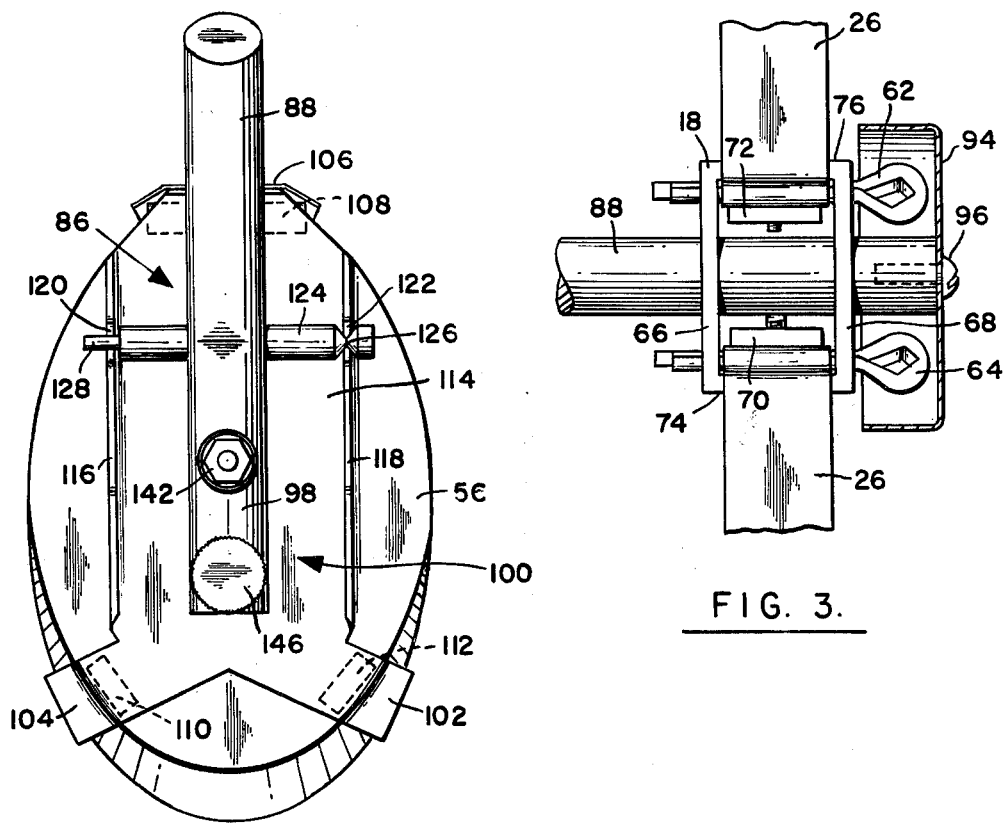
FIG. 5.
FIG. 3.

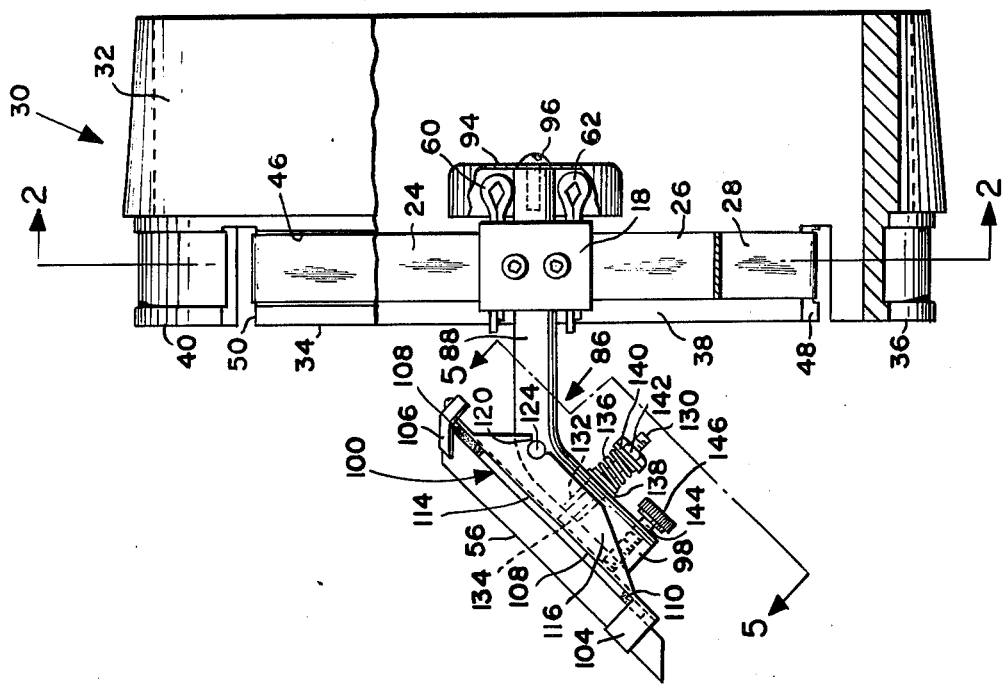
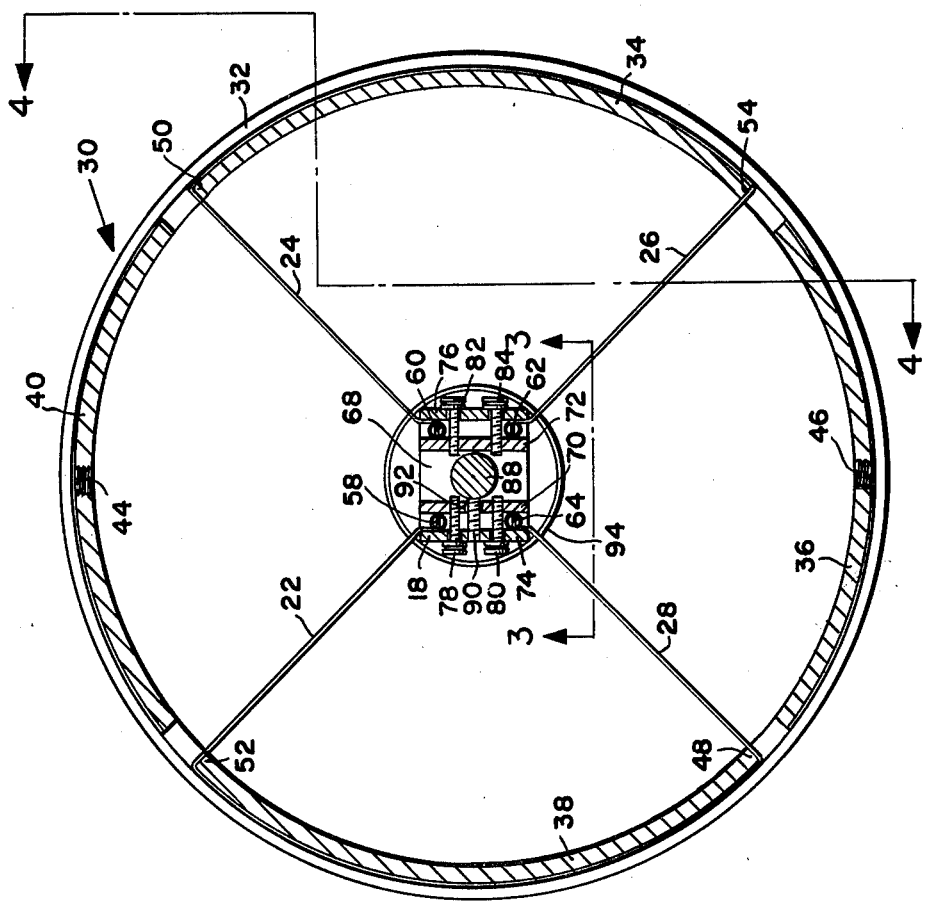
FIG. 4.
FIG. 2.

LOW OBSCURATION SPIDER FOR SUPPORTING OPTICAL ELEMENT

BRIEF SUMMARY OF THE INVENTION

This invention relates to optical instruments, such as reflecting telescopes, having spider-supported optical elements, and it relates particularly to improvements in the spider assembly of such instruments.

In most optical reflecting telescopes of the type used for astronomical observation, the secondary mirror is supported by the barrel of the telescope through a spider assembly comprising a number of elements extending radially from the secondary mirror carrier to the wall of the barrel. The presence of these radially extending elements in the path of light approaching the objective gives rise to "diffraction spikes", a phenomenon characterized by the appearance of spikes of light extending outwardly from the image of a star as observed through the telescope.

It is known that these diffraction spikes result from the presence of the radial elements of the spider, and that, from one telescope to another, they become less pronounced as the spider elements become less thick in the direction transverse to the direction of light approaching the objective. However decreasing the thickness of the spider elements generally decreases the stability of the secondary mirror mounting, so that the mirror can easily deviate from its desired position and vibrate as well. Heretofore, most successful spider elements in optical reflecting telescopes and similar instruments have been at least 0.02 inches thick in the direction transverse to the direction of incoming light.

The principal objects of the invention are to provide an optical element support producing minimum obscuration, and at the same time providing a highly stable and secure support; to provide for easy universal adjustment of the optical element; and to accomplish the foregoing objectives in a manner consistent with simple and relatively inexpensive construction.

In accordance with the invention, the optical element, for example a diagonal mirror in a Newtonian telescope, is supported from the wall of a barrel by a plurality of radially extending, flat, flexible metal vanes, each vane being disposed in a plane parallel to the optical axis and having a thickness less than about 0.01" in a direction perpendicular to the plane in which it is disposed, the vanes being in tension in the radial direction. Preferably, the tension of the vanes is made adjustable by adjusting means comprising a plurality of pins located on the carrier for the supported optical element, the pins being rotatable about axes parallel with the optical axis of the instrument, each pin having an axially disposed slot receiving one of the vanes, and each vane having a flexible end wrapped at least partially around one of the pins. Means, preferably clamping means, are provided for releasably securing the pins in fixed relationship to the carrier. These pins not only adjust the tension in the vanes, but are also usable to make fine adjustments in the radial position of the optical element. The tension of the vanes imparts stability to the optical element.

In the preferred form of the invention, the barrel of the instrument is constituted in part by a hollow cylinder and in part by a removable ring having an annular section and a pair of arcuate sections extending axially from the annular section into the interior of the hollow cylinder. Each of these arcuate sections has an external circumferential groove, the grooves being axially coextensive. There are two pairs of vanes. The first pair of vanes are parts of a continuous band of flexible metal extending around one of the grooves, and the other pair of vanes are parts of another continuous band of flexible metal extending around the other of the grooves. These grooves provide an extremely simple external support for the vanes, permit the use of a single band for each pair of vanes, and keep the vanes axially aligned and prevent the vanes from twisting in a very simple manner.

Where the invention is incorporated into an optical reflecting telescope having a diagonal mirror, axial and rotational adjustment of the mirror are provided for in a very simple manner by an axially extending circular cylindrical post received in an axially extending opening in the vane-supported carrier. Angular adjustment of the mirror is also provided.

Numerous other objects of the invention and important features will be apparent from the following detailed description when read in conjunction with the drawings.

The invention is applicable to a variety of optical instruments. It is primarily applicable in the supporting of secondary mirrors in optical reflecting telescopes, including diagonal mirrors in the Newtonian type of telescope, and the various secondary mirrors in telescopes having axially aligned eyepieces such as Cassegrain, Gregorian and Ritchie-Chretien telescopes. The invention is not limited to the support of secondary mirrors, however, and may be used for example to support optical elements such as photographic plates within a telescope barrel. Furthermore, the invention is not necessarily limited to use in telescopes, as it is applicable to the supporting of other optical elements such as light sources and targets in collimators, for example.

BRIEF DESCRIPTION OF THE DRAWINGS

FIG. 1 is a fragmentary perspective view of a telescope equipped with a spider in accordance with the invention;

FIG. 2 is a vertical section of a spider assembly taken through the plane 2—2 of FIG. 4;

FIG. 3 is a horizontal section showing the optical element carrier assembly as viewed through the surface 3—3 of FIG. 2;

FIG. 4 is a side elevation partly in section of the spider assembly as viewed from the right-hand side of FIG. 2; and FIG. 5 is a vertical section taken on the surface 5—5 of FIG. 4, and showing in detail the mechanism for angular adjustment of the mirror.

DETAILED DESCRIPTION

The invention will now be described with reference to an optical reflecting telescope 6 comprising a barrel 8, a primary mirror 10 located at end 12 of the barrel, and an opening 14 at its opposite end 16. Mirror 10 is the objective mirror of the telescope, and in the particular embodiment described, the mirror is parabolic (though other configurations are possible).

A secondary mirror, or other optical element, is located within the telescope barrel and supported by a carrier 18. The points at the center of the objective mirror and at the center of the secondary mirror or other optical element define the optical axis of the telescope, and the objective mirror 10 is arranged to receive light directed through the barrel in directions substantially parallel to the optical axis, and to reflect the light onto the secondary mirror or other optical element. In the Newtonian telescope shown, the secondary mirror is a planar diagonal mirror arranged to reflect light toward an eyepiece 20.

Carrier 18, the details of which are shown in FIGS. 2, 3 and 4 provides the entire support for the secondary mirror, and is in turn supported from the wall of barrel 8 by a plurality of radially extending, flat metal vanes 22, 24, 26 and 28. Each of these vanes is disposed in a plane parallel to the optical axis of the telescope, and preferably the thickness of a vane measured perpendicular to the plane in which it is disposed is less than about 0.01 inch. In a typical telescope in accordance with the invention, the vane thickness is 0.005 inch. Furthermore, the vanes are in tension in the radial direction. The combination of these characteristics provides for minimum obscuration of the incoming light, thus reducing the intensity of diffraction spikes, and at the same time providing a stable and secure support for the secondary mirror.

Preferably four vanes are used, the non-adjacent vanes being aligned with each other. This arrangement minimizes the number of diffraction spikes. At the same time the pairs of non-adjacent vanes are preferably perpendicular or nearly perpendicular to each other so that the tension of each pair of non-adjacent vanes can most effectively resist any tendency of the other pair to twist.

As shown in FIG. 2, carrier 18 is supported at the center of a removable end ring 30, which constitutes part of the barrel of the telescope. This ring has an annular section 32, and four arcuate sections 34, 36, 38 and 40, each of which is integral with, and extends axially from, annular section 32. These arcuate sections are adapted to extend axially into the interior of the hollow cylindrical part 42 (FIG. 1) of barrel 8, and threaded holes 44 and 46 are provided in opposed arcuate sections 40 and 36 respectively for receiving screws and securing the end ring to the hollow cylinder 42. The other two opposed arcuate sections 34 and 38 are present primarily to secure the outer ends of the vanes to the end ring. To this end sections 34 and 38 are provided with external circumferential grooves, (groove 46 being visible in FIG. 4). These grooves are axially coextensive, and just slightly wider axially than the width of the vanes. Each adjacent pair of vanes is part of a continuous band of flexible metal, preferably spring steel. Thus vanes 24 and 26 are part of a continuous band extending around groove 46 in arcuate section 34, and vanes 22 and 28 are likewise part of a continuous band extending around the circumferential groove in arcuate section 38. The grooves being only slightly wider than the bands, they keep the vanes axially aligned and prevent twisting. Furthermore, the grooves prevent the bands from being damaged during assembly of the barrel.

In FIG. 2, it will be noted that end 48 of arcuate section 38 is diametrically opposed to end 50 of arcuate section 34. Likewise, end 52 of arcuate section 38 is diametrically opposed to end 54 of arcuate section 34. In this way, non-adjacent vanes 24 and 28 are aligned, as are non-adjacent vanes 22 and 26.

As shown in FIG. 4, the optical element supported by carrier 18 is a diagonal first-surface planar mirror 56. The mirror, carrier 18, and end ring 30 are removable as a unit from the hollow cylindrical part 42 (FIG. 1) of the barrel. The removability of this assembly as a unit greatly facilitates assembly, adjustment, and repair and replacement as well. While the assembly shown comprises an end ring, it is possible to support a similar carrier and optical element in a similar manner from a ring other than an end ring, while still taking advantage of the fact that the ring and optical element are removable as a unit from the remainder of a barrel.

As best shown in FIG. 2, the inner ends of the four vanes are respectively secured to slotted pins 58, 60, 62 and 64. As seen in FIG. 3, these pins can be conventional cotter pins which extend in the axial direction through aligned holes in axially spaced parallel walls 66 and 68 of carrier 18. The end of each vane is received in the axially disposed slot of its corresponding pin, and the end of the vane is wrapped at least partially, and preferably several times, around the pin. In order to secure the pins releasably in fixed relation to the carrier, a pair of clamping plates 70 and 72 are provided. As seen in FIG. 3, carrier 18 comprises parallel walls 66 and 68, and side walls 74 and 76, the walls being arranged to form a rectangular box having opposite open ends. Carrier 18 can be made, for example, by extrusion of aluminum. Plate 70 is located within the carrier in generally parallel spaced relation with end wall 74. Likewise, plate 72 is within the carrier and in generally parallel spaced relationship to end wall 76. Plate 70 is secured to end wall 74 by means of a pair of clamping screws 78 and 80, both of which are threaded into holes in plate 70. From FIG. 2, it will be seen that tightening of screws 78 and 80 pulls plate 70 toward end wall 74, clamping pins 58 and 64 in fixed relation to carrier 68. Pins 60 and 62 are similarly clamped between plate 70 and end wall 76 by tightening clamping screws 82 and 84.

The foregoing structure of the carrier and its associated slotted pins provides an extremely simple and convenient means for adjusting the tension of the vanes. Thus, by loosening screw 80, pin 64 can be turned to tighten vane 28, after which pin 64 can be secured by retightening screw 80. The remaining pins can be adjusted and secured in a similar manner. Significantly, not only do the pins provide for adjusting the tension of the vanes, but they also effect adjustment of the relationship between the vanes and the optical element held by the carrier. Consequently, the pins also provide a means whereby the radial position of the optical element can be adjusted.

The diagonal mirror 56 is secured to carrier 18 by means of a diagonal stalk generally indicated by the numeral 86 (FIG. 4) and comprising an axially extending circular cylindrical post 88 which extends through an axial opening in the carrier composed of aligned circular openings in walls 66 and 68 (FIG. 3), these circular openings being just slightly larger in diameter than post 88 to provide a clearance for rotational and axial movement of the post with respect to the carrier. By permitting axial and rotational freedom of post 88, the axial opening in the carrier also permits axial and rotational adjustment of diagonal mirror 56. The post is held in fixed relationship to the carrier by set screw 90, which is threaded into a hole in wall 74, and which extends through a clearance hole 92 in clamping plate 70. Set screw 90 can be loosened, so that it comes out of contact with post 88, permitting axial and rotational adjustment of the mirror.

As shown in FIGS. 1, 2, 3 and 4, the heads of the slotted pins are hidden behind a cup 94, which is secured by screw 96 to the end of post 88. Angular adjustment of the mirror can also be effected about an axis generally parallel to the reflecting surface of the mirror and perpendicular to the optical axis of the telescope by the mechanism best shown in FIGS. 4 and 5. Mirror stalk 86 includes an oblique section 98, which is continuous with axial post 88. Mirror 56 is fastened in a strain-free manner in a sheet metal clip 100, having three clamping members 102, 104 and 106 for holding the mirror against felt pads 108, 110 (FIG. 4) and 112 (FIG. 5), which cushion the mirror, and support it from flat plate 114 of the clip. Extending downwardly and perpendicularly from plate 114 of clip 100 are flanges 116 and 118, having downwardly facing V-notches 120 and 122 respectively. A transverse rod 124, press fit in a transverse hole in the stalk at the junction between post 88 and oblique section 98 cooperates with rod 124 in the manner illustrated in FIG. 5 to provide a transverse pivot axis for the mirror, and to prevent movement of the mirror from side to side. To this end, the rod has a doubly tapered groove 126, cooperating with V-notch 122, and a reduced cylindrical section 128, cooperating with V-notch 120. The doubly tapered groove 126 and reduced cylindrical section 128 prevent movement of the mirror from side to side, and at the same time permit differential expansion between clip 100 and rod 124. A threaded pin 130 extends through hole 132 in oblique section 98 of the stalk, and is secured to the underside of plate 100 at 134. A spring 136, in compression between washers 138 and 140, and held by nut 142 threaded on threaded rod 130, operates to urge the mirror in the downward direction so that the flanges of the mirror supporting clip are urged downwardly against rod 124. Nut 124 is used to adjust the tension of the spring. Screw 144, having a knurled head 146 is threaded into a hole in oblique section 98 of the stalk, and its opposite end abuts the underside of plate 100. Adjustment of screw head 146 adjusts the angular position of the mirror about the axis of rod 124.

I claim:

1. An optical instrument having a barrel, an objective mirror located at one end of the barrel and arranged to receive light directed through the barrel in directions substantially parallel to an optical axis and an optical element located within the barrel in the path of light approaching the objective mirror, in which said optical element is supported from the wall of the barrel by a plurality of radially extending, flat, flexible metal vanes, each vane being disposed in a plane parallel to said optical axis and having a thickness less than about 0.01" in a direction perpendicular to the plane in which it is disposed, and said vanes being in tension in the radial direction.

2. An optical instrument according to claim 1 having means for adjusting the tension in said vanes and thereby adjusting the radial position of said optical element.

3. An optical instrument according to claim 1 having means for adjusting the relationship between said optical element and said vanes and thereby adjusting the radial position of said optical element.

4. An optical instrument according to claim 1 having means for adjusting the relationship between said optical element and said vanes and thereby adjusting the radial position of said optical element, and carrier means carrying said optical element and said adjusting means, wherein each of said vanes is part of a band of flexible metal, and wherein said adjusting means comprises a plurality of pins located on said carrier means and rotatable about axes parallel with said optical axis, each pin having an axially disposed slot receiving one of said vanes, each vane having a flexible end wrapped at least partially around one of said pins, and means for releasably securing said pins in fixed relationship to said carrier means.

5. An optical instrument according to claim 1 having means for adjusting the relationship between said optical element and said vanes and thereby adjusting the radial position of said optical element, and carrier means carrying said optical element and said adjusting means, wherein each of said vanes is part of a band of flexible metal, and wherein said adjusting means comprising a plurality of pins located on said carrier means and rotatable about axes parallel with said optical axis, each pin having an axially disposed slot receiving one of said vanes, each vane having a flexible end wrapped at least partially around one of said pins, and clamping means, also carried by said carrier means, for releasably securing said pins in fixed relationship to said carrier means.

6. An optical instrument according to claim 1 in which said barrel is constituted in part by a removable ring, the outer ends of said vanes being secured to said ring whereby, the ring and said optical element are removable as a unit from the remainder of said barrel.

7. An optical reflecting telescope having a barrel, an objective mirror located at one end of the barrel and arranged to receive light directed through the barrel in directions substantially parallel to the optical axis of the telescope, and an optical element located within the barrel in the path of light approaching the objective mirror, in which said optical element is supported from the wall of the barrel by a plurality of radially extending, flat metal vanes, each vane being disposed in a plane parallel to the optical axis of the telescope and having a thickness less than about 0.01" in a direction perpendicular to the plane in which it is disposed, and said vanes being in tension in the radial direction.

8. An optical reflecting telescope according to claim 7 having means for adjusting the tension in said vanes and thereby adjusting the radial position of said optical element.

9. An optical reflecting telescope according to claim 7 having means for adjusting the relationship between said optical element and said vanes and thereby adjusting the radial position of said optical element.

10. An optical reflecting telescope according to claim 7 having means for adjusting the relationship between said optical element and said vanes and thereby adjusting the radial position of said optical element, and carrier means carrying said optical element and said adjusting means, wherein each of said vanes is part of a band of flexible metal, and wherein said adjusting means comprises a plurality of pins located on said carrier means and rotatable about axes parallel with said optical axis, each pin having an axially disposed slot receiving one of said vanes, each vane having a flexible end wrapped at least partially around one of said pins, and means for releasably securing said pins in fixed relationship to said carrier means.

11. An optical reflecting telescope according to claim 7 having means for adjusting the relationship between said optical element and said vanes and thereby adjusting the radial position of said optical element, and carrier means carrying said optical element and said adjusting means, wherein each of said vanes is part of a band of flexible metal, and wherein said adjusting means comprises a plurality of pins located on said carrier means and rotatable about axes parallel with said optical axis, each pin having an axially disposed slot receiving one of said vanes, each vane having a flexible end wrapped at least partially around one of said pins, and clamping means, also carried by said carrier means, for releasably clamping said pins in fixed relationship to said carrier means.

12. An optical reflecting telescope according to claim 7 in which said barrel is constituted in part by a removable ring, the outer ends of said vanes being secured to said ring, whereby the ring and said optical element are removable as a unit from the remainder of said barrel.

13. An optical reflecting telescope according to claim 7 in which said barrel is constituted in part by a removable end ring, the outer ends of said vanes being secured to said end ring, whereby the end ring and said optical element are removable as a unit from the remainder of said barrel.

14. An optical reflecting telescope according to claim 7 in which said barrel is constituted in part by a removable ring having an annular section and a pair of arcuate sections extending axially from said annular section, each of said arcuate sections having an external circumferential groove, said grooves being axially coextensive, and having two pairs of vanes, a first pair of vanes being parts of a continuous band of flexible metal extending around one of said external circumferential grooves, and the other pair of vanes being parts of another continuous band of flexible metal extending around the other of said external circumferential grooves.

15. An optical reflecting telescope according to claim 7 in which said barrel is constituted in part by a hollow cylinder and in part by a removable ring having an annular section and a pair of arcuate sections extending axially from said annular section into the interior of said hollow cylinder, each of said arcuate sections having an external circumferential groove, said grooves being axially coextensive, and having two pairs of vanes, a first pair of vanes being parts of a continuous band of flexible metal extending around one of said external circumferential grooves, and the other pair of vanes being parts of another continuous band of flexible metal extending around the other of said external circumferential grooves.

16. An optical reflecting telescope according to claim 7 in which said barrel is constituted in part by a removable ring having an annular section and a pair of arcuate sections extending axially from said annular section, each end of each arcuate section being diametrically opposed to an end of the other arcuate section, each of said arcuate sections having an external circumferential groove, said grooves being axially coextensive, and having two pairs of vanes, a first pair of vanes being parts of a continuous band of flexible metal extending around one of said external circumferential grooves, and the other pair of vanes being parts of another continuous band of flexible metal extending around the other of said external circumferential grooves.

17. An optical reflecting telescope according to claim 7 in which said optical element is a diagonal mirror.

18. An optical reflecting telescope according to claim 7 in which said optical element is a diagonal mirror, and having means for effecting axial, rotational and angular adjustment of said diagonal mirror.

19. An optical reflecting telescope according to claim 7 in which said optical element is a diagonal mirror secured to an axially extending circular cylindrical post, and including carrier means for carrying said diagonal mirror, the inner ends of said radially extending vanes being secured to said carrier means, and said carrier means having an axially extending opening receiving said post and permitting axial and rotational adjustment of the diagonal mirror.

20. An optical reflecting telescope according to claim 7 in which said optical element is a diagonal mirror secured to an axially extending circular cylindrical post, and including carrier means for carrying said diagonal mirror, the inner ends of said radially extending vanes being secured to said carrier means by rotatable, axially extending pins having axial slots receiving ends of said vanes, said carrier means having axially extending openings for receiving said pins, and said carrier means also having an axially extending opening receiving said post and permitting axial and rotational adjustment of the diagonal mirror.

21. An optical reflecting telescope according to claim 7 in which said optical element is a diagonal mirror secured to an axially extending circular cylindrical post, and including carrier means for carrying said diagonal mirror, the inner ends of said radially extending vanes being secured to said carrier means, and said carrier means having an axially extending opening receiving said post and permitting axial and rotational adjustment of the diagonal mirror, and also including means for effecting angular adjustment of the diagonal mirror about an axis generally parallel to the reflecting surface of the mirror and perpendicular to the optical axis of the telescope.

* * * * *